US011475096B2

(12) United States Patent
Rodriguez

(10) Patent No.: US 11,475,096 B2
(45) Date of Patent: *Oct. 18, 2022

(54) SYSTEM FOR SUBMITTING AND VERIFYING DRIVER AND VEHICLE INFORMATION IN RESPONSE TO CITATIONS

(71) Applicant: Lazaro Rodriguez, Miami Lakes, FL (US)

(72) Inventor: Lazaro Rodriguez, Miami Lakes, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,062

(22) Filed: Jun. 17, 2021

(65) Prior Publication Data

US 2021/0382959 A1      Dec. 9, 2021

Related U.S. Application Data

(63) Continuation of application No. 16/892,121, filed on Jun. 3, 2020, now Pat. No. 11,074,316.

(51) Int. Cl.
| | | |
|---|---|---|
| *G06F 16/957* | (2019.01) | |
| *G06F 3/0482* | (2013.01) | |
| *G06Q 50/18* | (2012.01) | |
| *G06F 16/93* | (2019.01) | |
| *G06F 16/958* | (2019.01) | |

(52) U.S. Cl.
CPC ........ *G06F 16/9577* (2019.01); *G06F 3/0482* (2013.01); *G06F 16/93* (2019.01); *G06F 16/986* (2019.01); *G06Q 50/18* (2013.01)

(58) Field of Classification Search
None
See application file for complete search history.

(56) References Cited

U.S. PATENT DOCUMENTS

| | | | |
|---|---|---|---|
| 2003/0055701 A1* | 3/2003 | Dutta ................. | G06Q 30/0284 705/1.1 |
| 2003/0125981 A1* | 7/2003 | Pedrazzoli Pazos .. | G06Q 30/04 705/34 |
| 2004/0049401 A1* | 3/2004 | Carr .......................... | G07C 9/27 705/325 |
| 2005/0273621 A1* | 12/2005 | Davis .................... | H04L 9/3231 713/182 |
| 2007/0192872 A1* | 8/2007 | Rhoads ................. | H04W 99/00 707/E17.113 |
| 2008/0219543 A1* | 9/2008 | Csulits ................. | G06V 30/127 382/135 |
| 2008/0238690 A1* | 10/2008 | Plant ....................... | G07C 9/27 340/573.1 |
| 2010/0280964 A1* | 11/2010 | Register, Jr. ......... | G06Q 30/018 705/317 |

(Continued)

*Primary Examiner* — Andrew B Whitaker

(57) ABSTRACT

A system for a user to submit complying documents in response to traffic and vehicle citations wherein the user's documents are submitted via a global computerized network. The system employs a server to store the submitted information into a database. The system has verification means to ensure that the images are acceptable and the information on the documents a user submits matches the information the agency has on record for the corresponding user. The system then verifies that a user has provided payment and is able to generate emails to the users prompting them to undertake different actions and saves copies of correspondence sent to and by the user.

19 Claims, 3 Drawing Sheets

(56) References Cited

U.S. PATENT DOCUMENTS

| | | | |
|---|---|---|---|
| 2013/0042966 A1* | 2/2013 | Look | B60R 13/105 156/227 |
| 2013/0073347 A1* | 3/2013 | Bogaard | G07C 5/085 705/13 |
| 2013/0146204 A1* | 6/2013 | Whelan | G06Q 30/018 156/60 |
| 2013/0151426 A1* | 6/2013 | Whelan | G09F 3/10 705/317 |

* cited by examiner

SYSTEM FOR SUBMITTING AND VERIFYING DRIVER AND VEHICLE INFORMATION IN RESPONSE TO CITATIONS

OTHER RELATED APPLICATIONS

The present application is a continuation of U.S. patent application Ser. No. 16/892,121, filed on Jun. 3, 2014, which is hereby incorporated by reference. U.S. patent application Ser. No. 16/892,121 is the continuation of U.S. patent application Ser. No. 16/039,270 filed on Jul. 18, 2018 that is also incorporated by reference. U.S. patent application Ser. No. 16/039,270 is the continuation-in-part application for U.S. patent application Ser. No. 14/196,466 filed on Mar. 4, 2014, which is hereby incorporated by reference. U.S. patent application Ser. No. 14/196,466 is the parent application of provisional application 61/748,174 filed on Jan. 2, 2013 that is also incorporated by reference.

BACKGROUND OF THE INVENTION

Field of the Invention

The present invention relates to a system that enables a cross-browser dialog platform for the submission and verification of documentary evidence to satisfy at least one outstanding citation.

The present invention relates to the field of submitting compliance documents and information; and paying via the internet for traffic citations/violations that requires compliance; more specifically; These charges/violations are; driver's license, tag/registration, insurance, defective equipment, etc.

BACKGROUND ART

Traffic citations are part of every-day life for the public. Most citations you can pay online (via the internet) that deal with speeding, seatbelts, etc.

One of the issues associated with paying traffic citations via the internet; is that you cannot pay via the internet for violations that requires compliance; Driver license, tag/registration, insurance, and defective equipment. Compliance violation payments can be made in person at the county clerk office or by mailing appropriate documentation with payment. The county clerk has an interest in receiving compliance documentation and payment via the internet to improve efficiency, reduce cost, convenient for the public, etc. These current available compliance payments do not adequately solve the aforementioned problems with the prior art.

Therefore, what is needed is a system and method for improving the problems with the prior art, and more particularly for a more efficient system and method for Approving and validating traffic citation documentation for compliance via the internet Also, allowing via the internet (online) payments for compliance violations.

Currently, no system exists to deal with submitting compliance documents in response to a driver or vehicle infraction via the Internet. At the present time, a user must physically deliver the compliance documents to a nearby Department of Motor Vehicles branch or other appropriate agency. This is time-consuming for the users and many times requires that a user incur additional costs to transport him or herself to the Department of Motor Vehicles branch or other appropriate agency.

SUMMARY OF THE INVENTION

Embodiments of the present invention address deficiencies of the art in respect to traffic citations that requires compliance and provide a novel system and method for approving and validating traffic citation documentation for compliance via the internet; and allowing via the internet (online) payments for compliance violations.

In an embodiment of the Invention, a system for approving and validating traffic citation compliance documentation comprises a server to a networked communication system; a computer, tablet computer, web application or a smart phone application; a networked connection to a state's/city/county highway and motor vehicle database; including an interface on the smart phone application and web application to upload compliance documentation and make a payment; Also, a web application and smart phone application available for counties, cities, or states that choose to be networked with a web service.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

It is one of the main objects of the present invention to provide a system where a user can comply with the requirements set forth in a citation to provide documentation by using the Internet to submit such documents.

It is another object of this present invention to provide such a system that automatically can read information from a user's submitted documents and verify the user to match his or her case.

It is another object of this present invention to provide such a system that ensures that a submitted image is of an optimal size to require the least bandwidth possible while retaining clarity.

It is yet another object of this present invention to provide such a system that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consisting the details of construction and combination of parts as will be more fully understood from the following description, when read in conjunction with the accompanying drawings in which.

DETAILED DESCRIPTION

Figure 1:
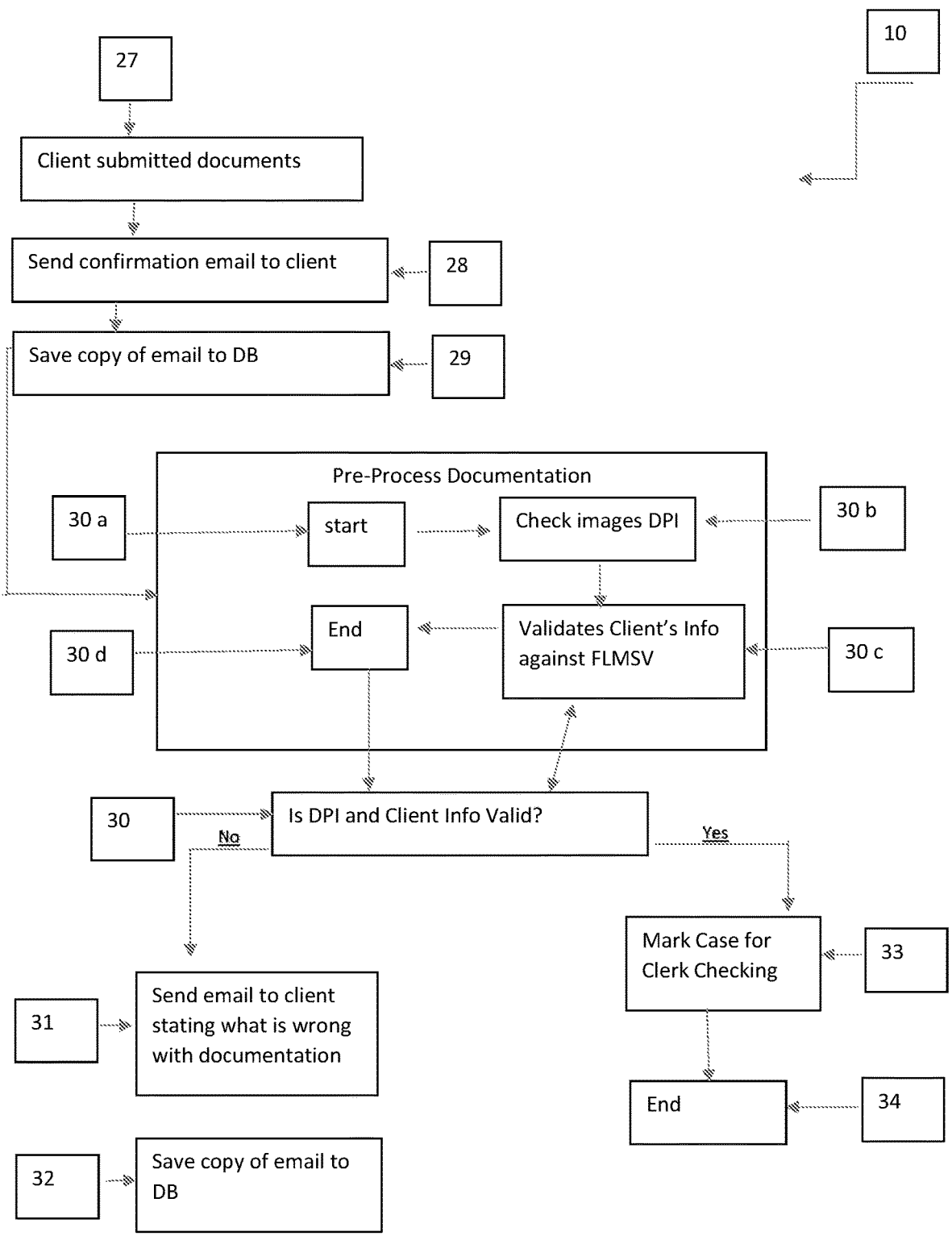
FIG. 1 represents a block diagram illustrating the system for verifying client or user submitted compliance documents wherein a court clerk employs the system to determine if the user or client submitted documents are complying.

User can use their computer, smart phone, or tablet computer; via the internet; to go to web application; and upload compliance documentation; Uploaded and entered information and compliance documentation is transmitted through networked communication system to be approved by a qualified person, automated system or a clerk county/state employee; Uploaded information and compliance documentation is validated with states or county's highway and motor vehicle data base; User can upload compliance documentation from their documents saved on computer, tablet computer, email, other web applications, other phone applications, Near field communication (NFC), web camera on computer, smart phone camera, tablet camera etc.;

User can download a smart phone application; smart phone application is connected/networked to state's or county's database to allow user to search for their citation; and upload compliance documentation; User can use camera on their smart phone to upload compliance documentation; User can upload compliance documentation from their documents saved on computer, tablet computer, email, other web applications, other smart phone applications, Near field communication (NFC), etc;

Uploaded and entered information and compliance documentation is transmitted through networked communication system to be approved by a qualified person, automated system or a clerk county/state employee;

Web application has an interface to upload compliance documents from user's documents saved on computer, tablet computer saved documents, email, other web applications, other smart phone applications, Near field communication (NFC); etc.; Web application interface has the capabilities to accept payment or direct user to make payment at state's or county's system; Uploaded and entered information and compliance documentation is transmitted through networked communication system to be approved by a qualified person, automated system or a clerk county/state employee;

Smart Phone application has an interface to upload compliance documents from user's documents saved on computer, tablet computer saved documents, email, other web applications, other smart phone applications, Near field communication (NFC), etc; or using the camera on smart phone; Web application interface has the capabilities to accept payment or direct user to make payment at state's or county's system;

Uploaded and entered information and compliance documentation is transmitted through networked communication system to be approved by a qualified person, automated system or a clerk county/state employee;

Tablet Computer application has an interface to upload compliance documents from documents saved on computer, tablet computer saved documents, email, other web applications, other smart phone applications, Near field communication (NFC), etc; or using the camera on the tablet computer to upload compliance documentation; Tablet Computer application interface has the capabilities to accept payment or direct user to make payment at state's or county's system; Uploaded and entered information and compliance documentation is transmitted through networked communication system to be approved by a qualified person, automated system or a clerk county/state employee;

The entire invention can be independent from a county/city/state system or can be networked/connected to a county/city/state system with a web service or any other technological service.

The required documents can also be uploaded can by scanning bar codes, QR codes, any type of codes that are placed/embedded on the required documents for compliance.

Compliance and Entered information can be validated with a states/county/city system/database or any third-party database.

Additional aspects of the invention will be set forth in part in the description which follows, and in part will be obvious from the description, or may be learned by practice of the invention. The aspects of the invention will be realized and attained by means of the elements and combinations particularly pointed out in the summary of the invention.

It is to be understood that the summary of the invention, the detailed description, and foregoing drawing description, are exemplary and explanatory only and are not restrictive of the invention as declared.

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

Referring now to the drawings, where the present invention is generally referred to with numeral 10, it can be seen in FIG. 1 that a user or client submits documents in step 27. The documents may include a driver's license, tag/registration, insurance, proof of compliant equipment, etc. As seen in FIG. 1, once the system receives the documents it sends a confirmation email to the client or user. At which point a copy of the email is saved to the system's database as shown by step 29.

Figure 2:
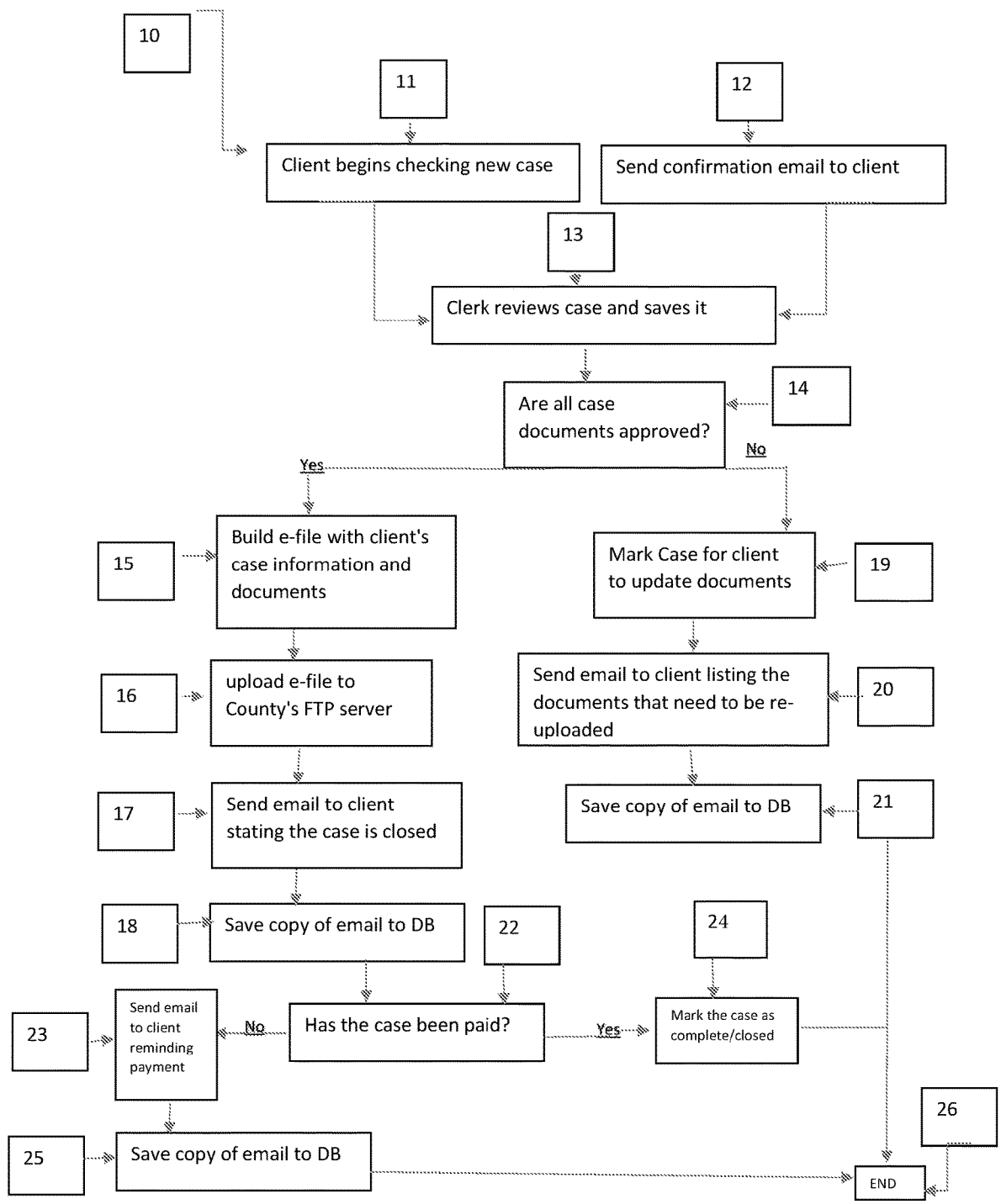
FIG. 2 shows a block diagram representing an embodiment of the system wherein the process is automated (without the use of a court clerk) and a user or client submits documents and a detailed representation of the automated document verification stage.

A user can enter information with a query directly to their database using suitable software, such as a php script, API, or equivalent. As shown in FIG. 2, the system then starts the image and information verification process in step 30*a*. In this alternate embodiment, step 30*a* can be employed automatically independent of any clerk involvement. The system then checks the image dots per inch (DPI) in step 30*b* using PHP, JAVA, or Javascript for the web application or the same means or a CGimage source for a phone application. It can read the information from the scanned image in step 30*c* using JAVA Computer Vision or OCROPUS—a document analysis and optical character recognition (OCR) system.

In this alternate embodiment, step 30*a* can be employed automatically independent of any clerk involvement. The system then checks the image dots per inch (DPI) in step 30*b* using PHP, JAVA, or Javascript for the web application or the same means or a CGimage source for a phone application. It can read the information from the scanned image in step 30*c* using JAVA Computer Vision or OCROPUS—a document analysis and optical character recognition (OCR) system. The required documents can also be uploaded by scanning bar codes, QR codes, anytype of codes that are placed/embedded on the required documents for compliance.

Once this is finished, it marks the end of the document verification process of the system as shown in step 30*d*. If the DPI or the information on the document is not valid when checked with the agency's database, an email is sent to the client stating what is wrong with the documentation as shown in step 31. This can be done using php script, html, or java script. To verify whether the information matches the agency's database, the system can sync its SQL database with the agency's and can use API or HTML to obtain the information, this is called JSON or Parcer. After the email is sent to the client stating the problems with the documentation, a copy of the email is saved to the database, as shown instep 32. If the DPI and information is valid, the case is marked for the clerk or authorized personnel to check it, as shown in step 33. This then marks the end of the verification process shown in FIG. 2.

Figure 3:
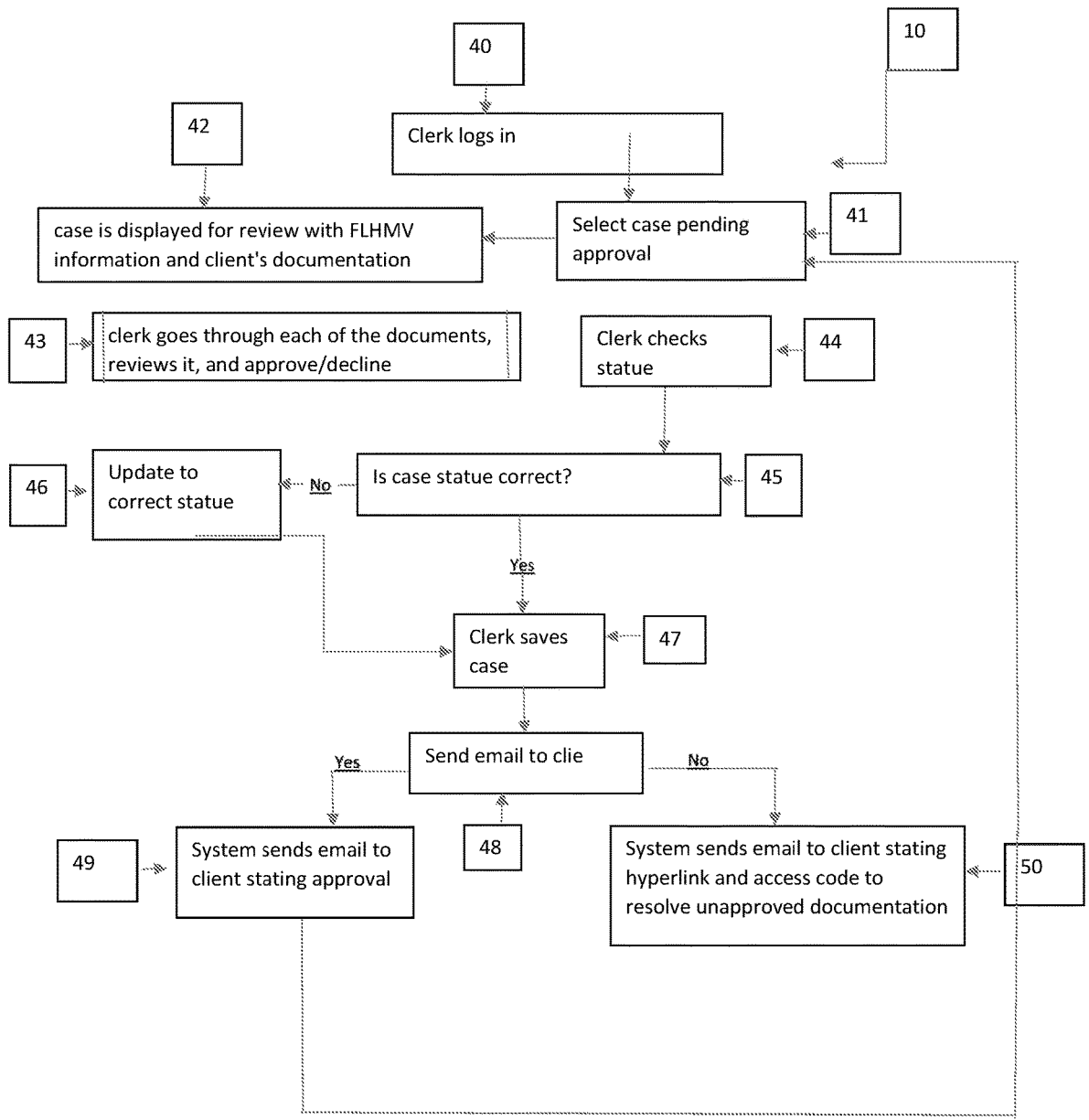
FIG. 3 illustrates a block diagram showing the system for verifying user submitted compliance documents wherein a clerk works with the system to verify whether the documents comply with the statute(s).

FIG. 3 shows an alternative embodiment wherein the court clerk or authorized personnel begins the validation process once he or she receives the case. The clerk or authorized personnel then logs in as shown in step 40. The clerk or authorized personnel selects a case pending approval as shown in step 41. The case information, including the agency's information and client's documentation is then displayed to the clerk or authorized personnel in step 42. The clerk subsequently checks the statute or statutes relating to the citation involved in the case as shown in steps 43 and 44 to reconfirm that all the documents are correct and comply with the statute. The clerk or authorized personnel confirms that the correct statute is being used in that case as shown in step 45. If the correct statute is not being used, then the clerk or authorized personnel updates it to the correct statute as shown in step 46.

After verifying that the statute (the pertinent law) pertains to the citation at issue, the clerk saves the case as shown in step 47 and confirms that the documents were approved in step 48. At which time the system sends an email using one of the methods described above to the user or client stating approval as shown in step 49, or alternatively, sends an email to the client including a hyperlink and access code wherein the user or client can resubmit complying documentation as shown in step 50. These final steps in FIG. 3 are similar to those shown in FIG. 2 wherein if the documents are not approved in step 14 of FIG. 2, then the system marks the case for the client to update the documents in step 19.

FIG. 2 shows an embodiment wherein a court clerk uses the system to process and validate user submitted documents. As seen in FIG. 2, the embodiment begins with step 11 wherein a clerk receives a new case. Alternatively, as shown by step 12 court clerk or authorized personnel begins checking an existing case. At step 13, the clerk reviews the case and saves it. The clerk or authorized personnel reviews the case based on the documents the The system then sends an email to the client or user regarding the documents that need to be re-uploaded in step 20 and a copy of the email is saved in the database as shown in step 21. At this point the process ends at step 26.

Alternatively, as shown in FIG. 2, if the documents do comply with the agency's requirements, the system builds an e-file, as seen in step 15, with the client or user's case information that was entered by the user and verified by comparing the user submitted documents with the client's information on the agency' database.

The system then uploads creates e-file to the agency's FTP server as shown by step 16. The system then sends an email to the client stating that the case is closed as shown in step 17. A copy of the email is then saved to the agency's database as shown by step 18. As shown in FIG. 1, the system then prompts the user or client to provide payment as shown in step 22.

Once a client or user pays, the case is complete as shown by step 24 and the system's process concludes as shown by step 26. In the alternative, if the case has not been paid, an email is generated by the system reminding the client or user to provide payment as shown by step 23. Afterwards, a copy of the payment reminder email is saved to the system's database as shown by step 25 and the system's process concludes as shown by step 26. The present application will employ a memory function to retain photographs and scanned documents uploaded by users.

In an alternate embodiment, an officer or authorized personnel will have access to the application to be able to upload images in real-time and verify them with the agency's database. A user can communicate with the officer via the application using NFC, email verification. In addition, a user that is cited without a license or other document can take a picture of him or herself and submit it through the application in order to verify against the agency's database that he or she has the necessary compliant documents. In an alternate embodiment, if the user receives a citation for not having his or her seatbelt, the user can approach a third party that can rectify the violation by submitting the compliant documents. Means for communication with the county's server may include text messaging, email communication, and Internet browsers.

A user can enter information with a query directly to their database using suitable software, such as a php script, API, or equivalent. The system then starts the image and information verification process. In this embodiment can be employed automatically independent of any clerk involvement. The system then checks the image dots per inch (DPI) in step 30b using PHP, JAVA, or Javascript for the web application or the same means or a CGimage source for a phone application. It can read the information from the scanned image in step 30c using JAVA Computer Vision or OCROPUS—a document analysis and optical character recognition (OCR) system. It can read the information from the required documents can also be uploaded can by scanning bar codes, QR codes, any type of codes that are placed/embedded on the required documents for compliance. In an alternate embodiment, a qualified person, automated system, clerk county/state employee, authorized person, can approve documents, upload documents, and verify information in real-time by scanning a QR code to start the image and information verification process and then validating compliance information with a city/state/county agency database or a highway safety motor vehicle database. Authorized person can scan QR code from other smart phone applications.

What is claimed is:

1. A system for the submission and verification of documentary evidence to satisfy at least one outstanding citation comprising:
   a computing device comprising at least one processor and memory that contains instructions that are readable by the processor and cause the computing device to:
   wherein a web application receives a citation related to a user, at least one violation, and update a current status;
   wherein said web application checks a database coupled to the computing device for requirements associated with the at least one violation to satisfy the citation and update the current status of the citation;
   wherein said web application synchronizes the database with an agency database using at least one of the JSON or Parcer to access an application programming interface (API) of the agency database, wherein said web application updates a dots per inch (DPI) Electronic File requirement for submitted compliance documentation to match a dots per inch (DPI) Electronic File requirement for submitted compliance documentation in the agency database, wherein the agency database is associated with at least one of a state, city, or county, wherein the compliance documentation is at least one of a driver's license, registration, insurance, or proof of compliant equipment;

wherein said web application receives said compliance documentation required to satisfy the citation and updates the current status;

wherein said web application analyzes the compliance documentation to determine the DPI;

wherein said web application compares the DPI of the compliance documentation with the DPI requirement;

wherein said web application determines the compliance documentation complies with the DPI requirement;

wherein said web application analyzes the DPI of the compliance documentation through PHP, JAVA, or Javascript;

wherein said web application analyzes the DPI of the compliance documentation and receive the information with said at least one violation, said web application updates said current status and displays a message with the requirements associated with said at least one violation to satisfy the citation.

2. The system set forth in claim 1, wherein the web application analyzes, compares, and determines the compliance documentation complies with the DPI.

3. The system set forth in claim 1, wherein the web application analyzes, compares and determines the compliance documentation complies with the DPI requirement further includes a smart phone application's CGImage source PHP, JAVA, or Javascript.

4. The system set forth in claim 1, wherein said web application processes said compliance documentation using JAVA Computer Vision or OCROPUS (OCR) which analyzes, compares, and determines the compliance documentation complies with the DPI requirement.

5. The system set forth in claim 1, wherein said computing device includes a smart phone application which processes documents using JAVA Computer Vision or OCROPUS (OCR).

6. The system set forth in claim 1, wherein the application programming interface includes a web service, API, networked communication system, html, internet browsers, or a smart phone application.

7. The system set forth in claim 1, wherein said compliance documentation is validated with a state, a city, or a county highway and motor vehicle database.

8. The system set forth in claim 1, wherein said web application processes, verifies, and automatically approves compliance documentation or compliance documentation information by scanning bar codes, QR codes which stands for quick response code that is a machine-readable optical label, that are placed/embedded on said compliance documentation using a smart phone application.

9. The system set forth in claim 1, wherein said web application receives a citation related to the user, further includes a user communication address.

10. The system set forth in claim 1, wherein the web application analyzes, compares, and determines the compliance documentation complies with the DPI requirement, mark the citation for review.

11. The system set forth in claim 1, wherein the web application analyzes, compares, and determines the compliance documentation complies with the DPI requirement, accept or direct the user to make payment.

12. A system for the submission and verification of documentary evidence to satisfy at least one outstanding citation comprising:

a computing device comprising at least one processor and memory that contains instructions that are readable by the processor and cause the computing device to:

wherein a web application receives a citation related to a user, at least one violation, and update a current status;

wherein said web application checks a database coupled to the computing device for requirements associated with the at least one violation to satisfy the citation and update the current status of the citation;

wherein said web application synchronizes the database with an agency database using at least one of the JSON or Parcer to access an application programming interface (API) of the agency database, wherein said web application updates a dots per inch (DPI) Electronic File requirement for submitted documentation to match a dots per inch (DPI) Electronic File requirement for submitted documentation in the agency database, wherein the agency database is associated with at least one of a state, city;

wherein said web application receives documentation required to satisfy the citation and updates the current status, wherein the documentation is at least one of a driver's license, registration, insurance, or defective equipment;

wherein said web application analyzes the compliance documentation to determine the dots per inch (DPI);

wherein said web application compares the DPI of the compliance documentation to the DPI requirement;

wherein said web application determines the compliance documentation complies with the DPI;

wherein said web application analyzes and determines a compliant DPI document and received information with at least one violation satisfies the requirements associated with said at least one violation, update the current status indicating a message to satisfy the citation.

13. A system for the submission and verification of documentary evidence to satisfy at least one outstanding citation comprising:

a computing device comprising at least one processor and memory that contains instructions that are readable by the processor and cause the computing device to:

wherein a smart phone application receives a citation related to a user, at least one violation, and updates a current status; wherein said smart phone application checks a database coupled to the computing device for requirements associated with the at least one violation to satisfy the citation and update the current status of the citation;

wherein the requirements associated with the violation is at least one of a driver's license, tag/registration, insurance or defective equipment that defines a compliance documentation;

wherein said smart phone application receives compliance documentation required by scanning a QR code placed or embedded on the compliance documentation to satisfy the citation and update the current status, wherein said QR code stands for quick response code;

wherein said smart phone application synchronizes databases, wherein said web application updates a dots per inch (DPI) Electronic File requirement for submitted compliance documentation to match a dots per inch (DPI) Electronic File requirement for the QR code that is placed or embedded on the compliance documentation that is submitted to match a DPI requirement for the QR code that is placed or embedded on the submitted compliance documentation in the database, wherein said smart phone application synchronizes the database with an agency database to access an application programming interface (API) of the agency database to validate said compliance documentation, wherein the agency database is associated with at least one of a state, city, or county database;

wherein said smart phone application analyzes the QR code that is placed or embedded on the compliance documentation through PHP, JAVA, or Javascript to determine the DPI thereof defining a compliance documentation DPI; wherein said smart phone application compares said compliance documentation with a DPI associated to a QR code requirement;

wherein said smart phone application, updates the current status.

14. The system set forth in claim 13, wherein the smart phone application analyzes, compares and determines the QR code placed or embedded on the compliance documentation complies with documentation requirements is further connected to a third-party database DPI requirement.

15. The system set forth in claim 13, wherein said compliance documentation is validated with a state, a city, or a county highway and motor vehicle database.

16. The system set forth in claim 13, wherein said smart phone application processes compliance documentation using JAVA Computer Vision or OCROPUS (OCR) which, processes, analyzes, compares, and determines the compliance documentation complies with documentation requirements.

17. The system set forth in claim 13, wherein said smart phone application processes a documentation valid status with a highway and safety motor vehicle database by scanning bar codes, QR codes, that are placed/embedded on the compliance documentation.

18. The system set forth in claim 13, wherein said compliance documentation is capable of being uploaded using said smart phone application by scanning bar codes or a QR code thereof.

19. The system set forth in claim 13, wherein when said smart phone application is unable to process compliance documentation information by scanning bar codes, QR codes, codes that are placed or embedded on said compliance documentation, displays a message.

* * * * *